United States Patent
Yasuda et al.

(10) Patent No.: US 6,860,505 B2
(45) Date of Patent: Mar. 1, 2005

(54) AIRBAG DEVICE FOR USE IN A VEHICLE

(75) Inventors: Mitsuo Yasuda, Fukumitsu-machi (JP);
Yoshiharu Nakashima, Fukumitsu-machi (JP)

(73) Assignee: Sanko Gosei Kabushiki Kaisha, Toyama-ken (JP)

(*) Notice: Subject to any disclaimer, the term of this patent is extended or adjusted under 35 U.S.C. 154(b) by 0 days.

(21) Appl. No.: 09/975,665

(22) Filed: Oct. 10, 2001

(65) Prior Publication Data

US 2003/0067145 A1 Apr. 10, 2003

(51) Int. Cl.$^7$ ................................................. B60R 21/16
(52) U.S. Cl. ............................... 280/728.3; 280/728.2; 280/732
(58) Field of Search ........................ 280/728.2, 728.3, 280/732

(56) References Cited

U.S. PATENT DOCUMENTS

| | | | |
|---|---|---|---|
| 4,148,503 A | 4/1979 | Shiratori et al. ............. | 280/731 |
| 5,183,288 A | 2/1993 | Inada et al. .................. | 280/732 |
| 5,322,324 A | 6/1994 | Hansen et al. ............... | 280/732 |
| 5,411,288 A | 5/1995 | Steffens, Jr. ............. | 280/728.3 |
| 5,549,324 A | 8/1996 | Labrie et al. ............. | 280/728.3 |
| 5,569,959 A | 10/1996 | Cooper et al. ............ | 280/728.3 |
| 5,685,560 A | 11/1997 | Sugiyama et al. .......... | 280/731 |
| 5,738,367 A | 4/1998 | Zichichi et al. .......... | 280/728.3 |
| 5,769,451 A * | 6/1998 | Inada et al. .................. | 280/732 |
| 5,779,262 A * | 7/1998 | Totani et al. ............. | 280/728.3 |
| 5,806,879 A * | 9/1998 | Hamada et al. .......... | 280/728.2 |
| 5,816,609 A | 10/1998 | Gray et al. ............... | 280/728.3 |
| 5,839,752 A * | 11/1998 | Yamasaki et al. ........ | 280/728.3 |
| 5,863,064 A * | 1/1999 | Rheinlander et al. ....... | 280/732 |
| 5,865,461 A * | 2/1999 | Totani et al. ............ | 280/728.3 |
| 5,868,419 A * | 2/1999 | Taguchi et al. .......... | 280/728.3 |
| 5,961,142 A | 10/1999 | Shiraki et al. ........... | 280/728.3 |
| 6,012,735 A | 1/2000 | Gray et al. ............... | 280/728.2 |
| 6,070,901 A | 6/2000 | Hazell et al. ............. | 280/728.3 |
| 6,076,851 A | 6/2000 | Davis, Jr. et al. ........ | 280/728.2 |
| 6,079,734 A | 6/2000 | Porter ....................... | 280/728.3 |
| 6,089,642 A | 7/2000 | Davis, Jr. et al. ............. | 296/70 |
| 6,109,645 A | 8/2000 | Totani et al. ............. | 280/728.3 |
| 6,161,865 A * | 12/2000 | Rose et al. ............... | 280/728.3 |
| 6,203,056 B1 | 3/2001 | Labrie et al. ............. | 280/728.3 |
| 6,250,669 B1 * | 6/2001 | Ohmiya ....................... | 280/732 |
| 6,299,198 B1 | 10/2001 | Nakashima et al. ...... | 280/728.3 |
| 6,340,170 B1 | 1/2002 | Davis et al. .............. | 280/730.1 |
| 6,394,485 B1 | 5/2002 | Amamori .................. | 280/728.2 |
| 6,406,056 B2 * | 6/2002 | Yokota ..................... | 280/728.2 |
| 6,435,542 B2 | 8/2002 | Nakashima et al. ...... | 280/728.3 |
| 6,494,481 B2 | 12/2002 | Yasuda ......................... | 280/732 |
| 2002/0005630 A1 | 1/2002 | Suzuki et al. ............ | 280/728.3 |

FOREIGN PATENT DOCUMENTS

| | | |
|---|---|---|
| JP | 06-144142 | 5/1994 |
| JP | 7-172256 | 7/1995 |
| JP | 07-291078 | 11/1995 |
| JP | 10-044910 | 2/1998 |
| JP | 11-198752 | 7/1999 |
| JP | 2001-206180 | 7/2001 |

* cited by examiner

*Primary Examiner*—Paul N. Dickson
*Assistant Examiner*—George D Spisich
(74) *Attorney, Agent, or Firm*—Ladas & Parry

(57) ABSTRACT

An airbag device for a passenger seat for use in a vehicle like an automobile. Reinforcement ribs 12 of rectangular horizontal cross-section protrudently extend downward from the back side of a fracture-opening section 30 of the interior cover. Mounting holes 14 are formed at the predetermined intervals in the front and rear side walls 12a of the reinforcement ribs (in the longer direction). Hooks 36 mounted to the front and rear side edge surfaces 5b of the airbag case 5 (in the longer direction) are joined to the mounting holes via a mounted section 35 extending downward from hinge sections 34 of reinforcement plate members 33. The left and right side walls 12b of the reinforcement ribs 12 are spaced from the left and right side edges 5c of the airbag case by a predetermined distance, and fracture grooves 30a of the fracture-opening section are formed at the portions positions spaced at the predetermined intervals.

4 Claims, 5 Drawing Sheets

AIRBAG DEVICE FOR USE IN A VEHICLE

BACKGROUND OF THE INVENTION

1. Field of the Invention

The present invention relates to an airbag device for use in a vehicle such as an automobile to protect passengers sitting at the front seat, the driver seat, or the seats at both the left and right side columns from any potential impact in an accident, thus proving more safety, and more particularly, it relates to the improvement in a fracture-opening section for use in inflating an airbag element, formed in an interior cover, in order to facilitate breakage of the cover.

2. Description of the Related Art

An airbag device for use in a vehicle such as an automobile installed at a driver seat, a passenger seat and left or right side columns basically comprises an airbag element, an airbag case accommodating the airbag element in its folded form and an inflator for inflating the airbag element, and is covered by an interior cover of the vehicle.

Furthermore, an interior cover of an automobile generally comprises an instrument panel cover made of synthetic resin such as polypropylene (hereinafter referred to an "interior cover") which covers a panel core made of molded form of synthetic resin such as polypropylene.

A conventional passenger-side airbag device 1, as shown in FIGS. 1 and 2, is installed on the horizontal surface of 3a of an interior cover 3 near a windshield 1a, accommodates an airbag element 4 in its folded form which will inflate by supplying a flow of gas from the inflator, and contains an airbag case 5 having an opening 5a opposite the rear surface of the interior cover 3, wherein an open lid 6 molded of flexible synthetic resin is mounted in an opening 3b formed in the interior cover 3, and the open lid 6 is separated apart in the forward and rearward directions by breaking off into two parts at grooves 6a, 6b formed in the center and periphery of the open lid 6 when an airbag element 4 inflates.

Then, on the rear surface of the open lid 6 are mounted mounting legs 7 having a rectangular shape in the horizontal cross section which is molded as a single unit having a slightly larger periphery than that of the opening 5a of the case 5, and a plurality of joiners 8 to engage elastically with the opening circumference of the opening 3b formed in the interior cover 3. And furthermore, a plurality of angular through holes 7c are formed on the front and rear wall surfaces 7a, 7b of the mounting legs 7, which are engaged with a plurality of hooks 9 mounted to the front and rear wall surfaces 5b, 5b of the opening 5a of the case 5, when the open lid 6 is attached to the opening 3b formed in the interior cover 3.

Here, when the airbag element 4 inflates, the open lid 6 breaks off the front and rear sections at the position of the grooves 6a, 6b formed at its periphery and center, and after the inflation of the airbag element, a plurality of angular holes 7c in the front and rear wall surfaces 7a, 7b of the mounting leg 7 remain engaged with the hooks 9 which are mounted to the front and rear wall surfaces 5b, 5b of the opening 5a of the case 5, hence preventing the open lid 6 from generating sharp edges of scattering broken pieces.

However, in the passenger-side airbag device as shown in FIG. 1, it is constructed such that the opening 3b in the interior cover 3 is formed in the position corresponding to the opening 5a in the airbag case 5, and further, the open lid 6 is mounted, which is engaged with this opening 3b and separately formed of flexible resin material different from that of the interior cover 3. Accordingly, there are still some troublesome problems to manufacture it, and the open lid 6 can be easily deformed against an external pressure, resulting in damaging the appearance or design of the interior cover.

Also, there might be another problem permitting the open lid 6 to pop out, because there is no reinforcement cover mounted on the back side of the open lid 6 in the separately formed open lid 6 and the engagement between the mounting legs 7 of the open lid 6, and the hooks 9 mounted to the forward and rear wall surfaces 5b, 5b of the opening 5a of the airbag case 5 can be easily separated because the engagement is made of flexible resin upon the inflation of the airbag element 4.

Accordingly, in order to overcome these problems as mentioned above, the present applicant proposed a seamless type passenger-side airbag system by our prior Patent Application No. 2000-20238 (filed on Jan. 28, 2000,), where the separately formed open lid is not used, and consequently no line appears in the interior cover.

FIG. 3 is a partial enlarged view showing that a fracture-opening section 30 for inflating the airbag is formed in a single plate shaped interior cover 3 of a passenger-side airbag device. FIG. 4 is a schematic cross-sectional view taken along the line 4B—4B in FIG. 3. FIG. 5 is an explanatory view showing the device with fracture-opening section 30 removed from the interior panel 3. FIG. 6 is an enlarged cross-sectional view taken along the arrow C in FIG. 5.

In FIGS. 3 and 4, in the interior cover 3, the fracture-opening section 30 for use upon the inflating of the airbag element is formed corresponding to the size of the opening 5a in the airbag case 5, by forming hinge grooves 30a, grooves 30b, 30c extending circumferentially in a dotted line or a broken line with a pulsating laser beam from a laser generating device (not shown) which releatively moves from the back side of the interior cover 3 along the external margins of reinforcement plates 10, 10, mounted to the back side of the interior cover. In addition, when the airbag element inflates, it breaks the fracture-opening section 30 lifting up the groove 30b formed therein into leftward and rightward longer directions in a way like a double-door opening outward.

This prior application provides the airbag device for automobiles constructed such that the fracture-opening section 30 in the interior cover 3 is separated from the interior cover 3 by the airbag element 4 when it inflates, and one end of the level surface of the reinforcement plates 10, 10, respectively is mounted to the back side of fracture-opening section 30 of the interior cover 3 by thermal bonding, while the other end thereof is allowed to hang at the rear surface of the interior cover 3 via hinges 11, 11 and engaged with a pair of reinforcement ribs 12 having distances slightly wider than the width of the opening 5a in the airbag case 5. With this construction, it has improved the drawbacks existing in the prior art with an open lid 6 constructed separately, hence reducing a force of impact onto a passenger when the vehicle or automobile is involved in a collision, preventing the fracture-opening section 30 of the interior cover 3 lifting up like double doors opening outward from popping out when the airbag element inflates, and further protecting the chest and head of passenger seated on the front seat from any potential danger.

Sections 13 is the thinned portion formed at the rear connecting portion in the interior cover 3 of a pair of reinforcement ribs 12. As the airbag elements is instantly inflated, it breaks down the thinned portion at the rear connecting portion of the interior cover 3 and abruptly lifts up the fracture-opening section 30 of the interior cover 3.

In the airbag device for automobiles constructed as described above, when the automobile is involved in a collision, its degree is detected by a sensor(s), which in turn is judged by a control device like a CPU, whether or not it is over the predetermined value, and in case the value is judged as "over the predetermined value", a signal output from the control device causes the inflator to generate a certain amount of gas.

The pressure for inflating the airbag element acts on the inside surface of the fracture-opening section 30 of the interior cover 3, causing the fracture-opening section to break along the grooves 30b, 30c, and separate from the interior cover 3, and then this separated fracture-opening section 30 can be opened outside of the interior cover 3 by fulcruming each hinge 11 of the reinforcement plate 10, 10 respectively.

At the same time, the airbag element 4 inflates outside of the interior cover 3 from the opened fracture-opening section 30, hence preventing the passenger from the impact from a collision of the vehicle by supporting the chests, heads, arms or legs of passengers seated on the driver seat, the passenger seat, and seats at both the left and right side columns.

However, there are still other drawbacks in the improved interior cover 3, and the fracture-opening section 30 has some detects in its safety as mentioned below. In the interior cover 3 of the prior improved device, hinge grooves 30a, the fracture grooves 30b, 30c are formed, penetrating at a right angle from the backside toward the front of the interior cover 3, and the reinforcement plates 10a, 10a bent by the hinges 11 along the longer direction of each of left and right sides of the fracture-opening section 30 are thermally bonded in place, respectively, and then, the other ends of the reinforcement plates 10, 10 are engaged with respectively a pair of front and rear reinforcement ribs 12, 12 protruding in the longer direction from leftward to rightward) of the fracture-opening section 30, so that in the front and rear fracture grooves 30a in the longer direction (from leftward to rightward) of the fracture-opening section 30, or in the central fracture groove 3b of the fracture-opening section 30, a fracture surface does not have any serious problems in its fracture shape when the airbag element inflates, while, since the fracture of the left and right fracture grooves 30c in the shorter direction (from forward to backward) has no hinges for the reinforcement ribs 12, 12 and the reinforcement plates 10, 10 the device is structurally weak in the fracture in frontward-rearward shorter directions of fracture-opening section 30 and the fracture surface becomes serrate. In particular, under such severe weather conditions where the temperature inside the car can rise to as high as +75° C. in summer and drop to −35° C. in winter, as shown in FIG. 6, a shearing force would act to cause sharp edges 3c to occur on the fracture surface.

SUMMARY OF THE INVENTION

It is an object of the present invention to provide an airbag device for automobiles that has a highly safe fracture-opening section wherein reinforcement ribs having a rectangular horizontal cross section are mounted at the rear surface of the interior cover in correspondence to the position of the airbag opening, and in addition, when the fracture-opening section breaks off, sharp edges are not easily formed at the fracture surfaces in the fracture-opening section, especially in frontward-rearward shorter directions.

According to the present invention having a fracture-opening section with a fragile portion made by fracture grooves at the rear surface of the interior cover opposite to the opening of the airbag and reinforcement ribs corresponding to the shape of the airbag opening, it can be provided with the airbag device for an automobile having a highly safe fracture-opening section so that sharp edges are not easily formed at the fracture surfaces in the fracture-opening section, especially in frontward to rearward shorter directions, comprising; protrudently providing reinforcement ribs of rectangular horizontal cross-section extending downward to the rear of the fracture-opening section of the interior cover; disposing the mounting holes formed at the predetermined intervals in the front and rear side walls (in the longer direction) of said reinforcement ribs; engaging the hook portion mounted to the front and rear side faces (in the longer direction) of said airbag case to the mounting holes via the mounting section downwardly extending from the hinges on the reinforcement plate; locating the left and right side walls spaced apart at intervals of a proper distance from the left and right side faces of said airbag case; and forming the fracture grooves of the fracture-opening section between each of said spaced portions.

DESCRIPTION OF THE PREFERRED EMBODIMENT

An airbag device for use in a vehicle according to an embodiment of the present will be described referring to the accompanying drawings.

Figure 1:
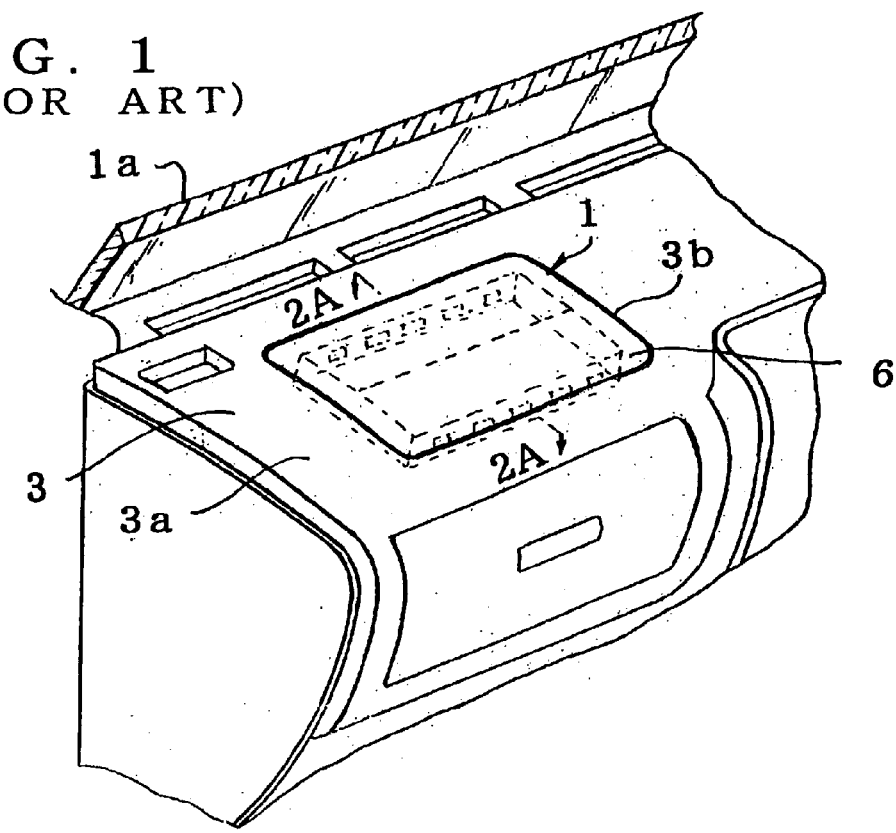
FIG. 1 is an explanatory view showing the conventional airbag system, wherein the fracture-opening section is formed in the instrument panel cover to make the airbag element break down when it inflates.
Figure 2:
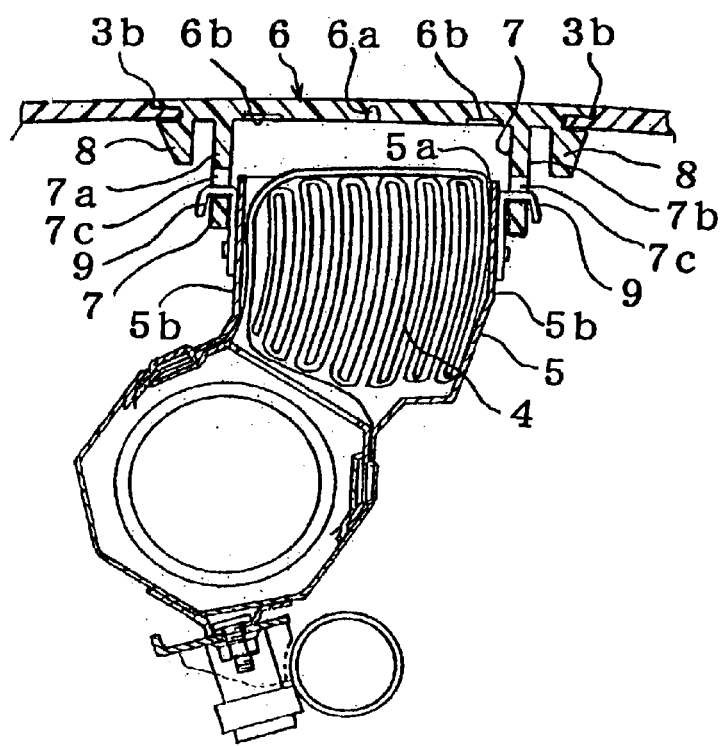
FIG. 2 is a cross-sectional view along the line 2A—2A in FIG. 1.
Figure 3:
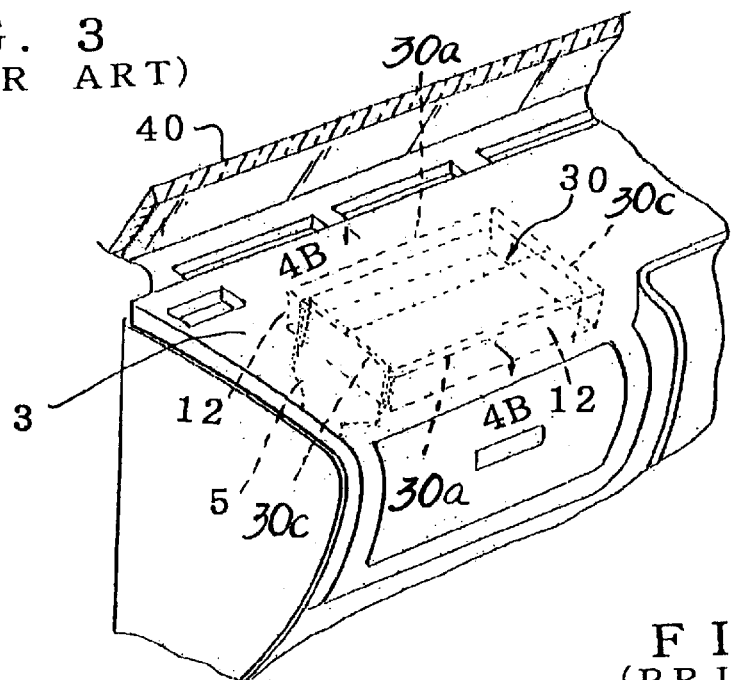
FIG. 3 is a partial enlarged explanatory view showing the conventional airbag system, wherein the fracture-opening section formed in the instrument panel cover to make it break down when the airbag element inflates.
Figure 4:
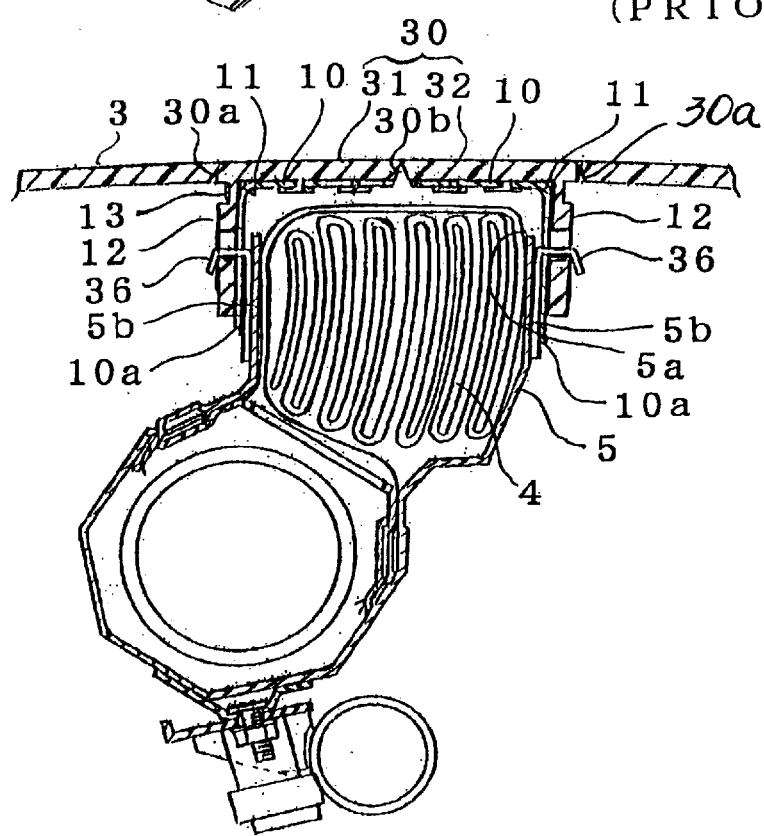
FIG. 4 is a schematic cross-sectional view along the line of 4B—4B in FIG. 3.
Figure 5:
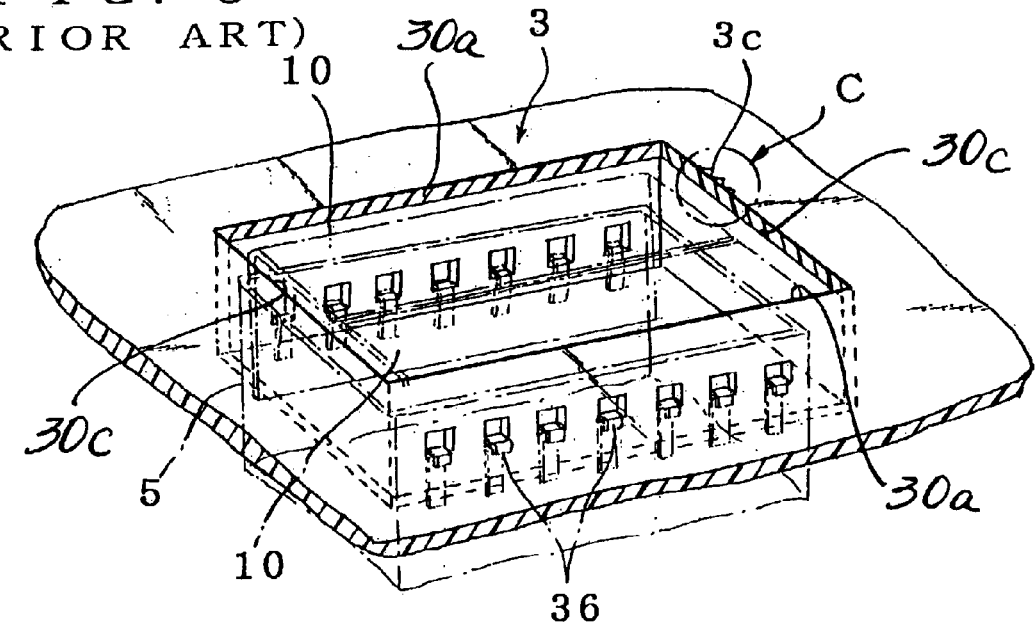
FIG. 5 is an explanatory view showing an interior panel with the fracture-opening section removed.
Figure 6:
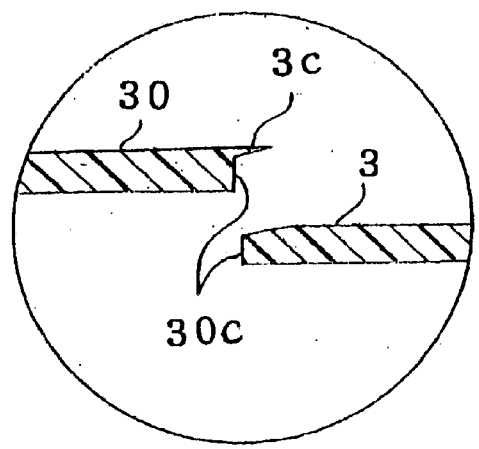
FIG. 6 is an enlarged cross-sectional view taken along the arrow C in FIG. 5.
Figure 7:
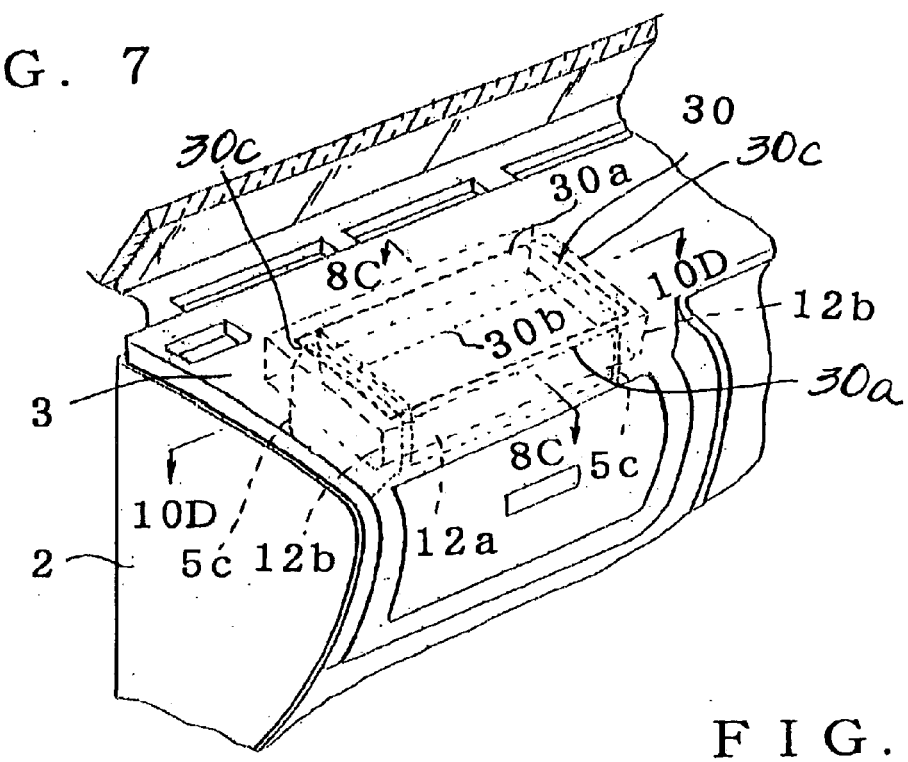
FIG. 7 is a perspective view of the airbag device for a vehicle or an automobile of the present invention, where it is applied to a passenger-side seat.
Figure 8:
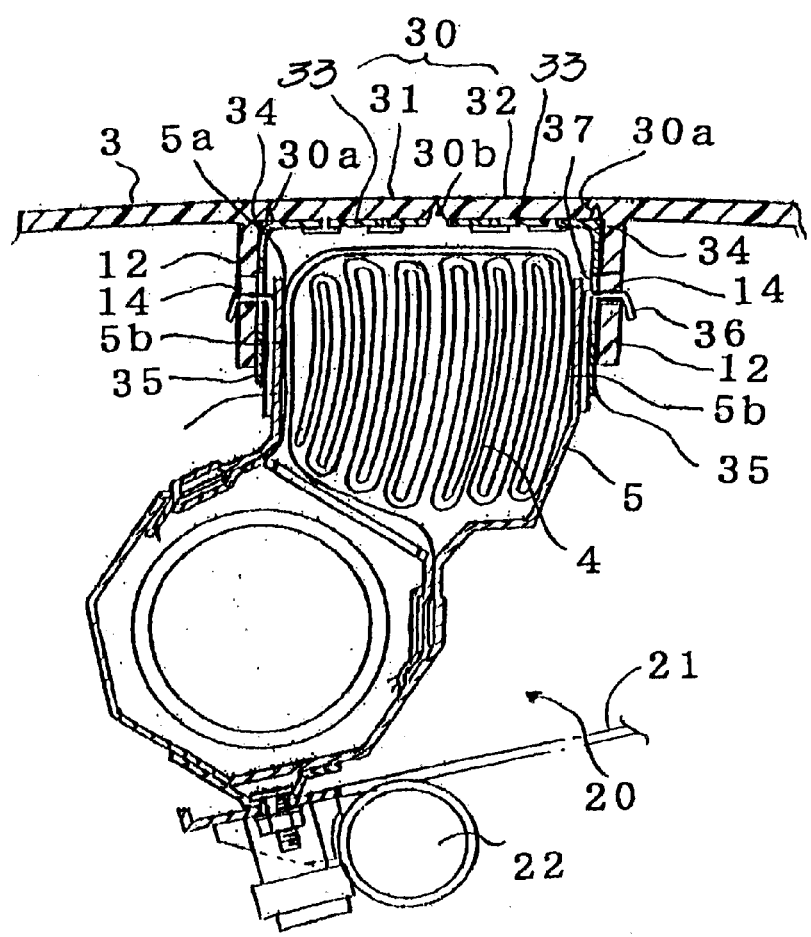
FIG. 8 is a cross-sectional view taken along the line 8C—8C in FIG. 7.
Figure 9:
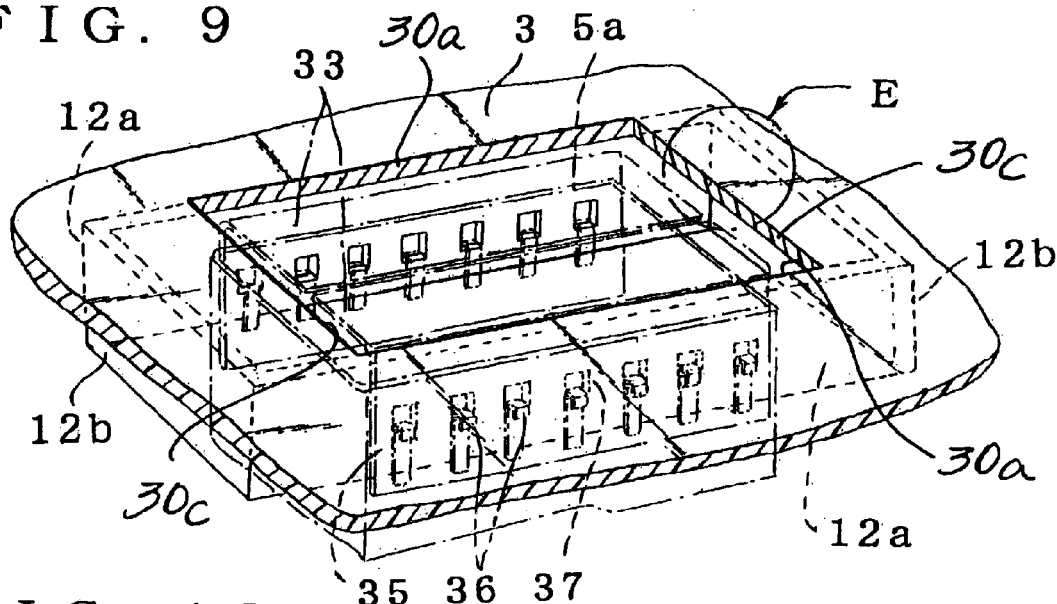
FIG. 9 is a partial top view of the interior cover with the airbag device for a passenger-side seat of the present invention being provided, showing a schematic explanatory view where the fracture-opening section being removed.
Figure 10:
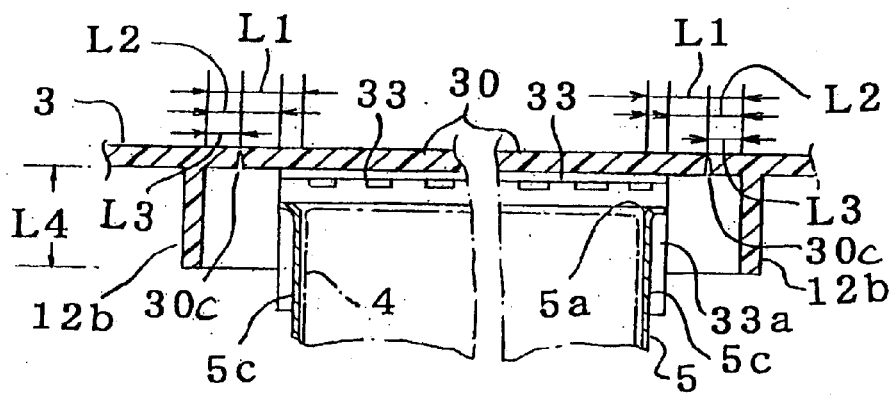
FIG. 10 is a cross-sectional view taken along the line 10D—10D in FIG. 7.
Figure 11:
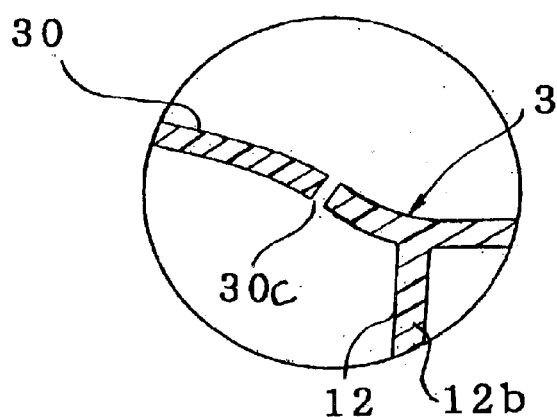
FIG. 11 is an enlarged view of the cross-sectional view taken along the arrow E in FIG. 9.

FIG. 7 is a perspective view showing primary elements of the preferred embodiment of the airbag device for automobiles of the present invention. FIG. 8 is a cross-sectional view taken along the line of 8C—8C in FIG. 7. FIG. 9 is a partial plan view of the interior cover where a passenger-side seat airbag device of the airbag device for automobiles of the present invention is placed, while the fracture-opening section is removed. FIG. 10 is a cross-sectional view taken along the line of 10D—10D in FIG. 7. FIG. 11 is an enlarged sectional view taken along the arrow E in FIG. 9.

As shown in FIGS. 7 and 8, there are provided an instrument panel cover 3 (hereinafter referred to an interior cover) covering the surface of an instrument panel core 2, which both are made of molded synthetic forms of resin such as polypropylene. The interior cover 3 is mounted to the instrument panel 2, which in turn is tightened by proper means like tapping screws to the frame of a vehicle (not shown).

As shown in FIG. 8, a receiving portion 20, in which a metal airbag case 5 is received, is formed with a partition member 21 at the location opposite to the passenger seat on the left side (a car made in Japan with the steering wheel situated on the right side). The present invention may be applied to a vehicle with the steering wheel situated on the left side where the passenger-side airbag system is installed at the corresponding position.

The partition member 21 can be mounted removably to the vehicle frame with a plurality of tapping screws so as to make it easy to build case 5 into the interior cover 3.

The fracture-opening section, which is fractured when the airbag 4 inflates 30, is formed at the location of the interior cover 3 opposite to the receiving portion 20. This fracture-opening section 30 is rectangular with nearly the same area as the opening 5a of the case 5, and will be fractured by the hinge groove 30a and fracture groove 30c by the laser cutting as described later on, and can be broken into 2 parts along the center fracture groove 30b that is a fragile section formed at the center of the fracture-opening section 30 in the longer direction thereof.

The back side of the interior cover 3 has reinforcement ribs 12 having a rectangular horizontal cross-section and mounted downward along the outer periphery of the fracture-opening section 30. A plurality of engaged holes 14 are formed respectively in the front and rear side walls 12a, 12a located in the leftward and rightward longer directions of these reinforcement ribs 12.

Furthermore, the airbag element 4 is received in the airbag case 5 in its folded form, and is connected to an inflator (gas generator) (not shown) disposed outside of the partition 21 via a gas flow pipe 22.

The fracture-opening section 30 is formed opposite to the opening 5a in the case 5 positioned below the interior cover 3, and comprises front and rear subsections 31, 32 to be broken down at the center of the fracture-opening section 30 extending longer in leftward to rightward directions. The left and right side walls 12b, 12b of the reinforcement ribs 12 are respectively spaced apart from the left and right side walls 5c and 5c of the airbag case 5 at the predetermined intervals, and the fracture groove 30c of the fracture-opening section is formed between these spaced walls.

Further, in the front and rear subsections 31, 32 broken into 2 parts at the fracture groove 30b, the fracture groove 30b may be slightly biased so that the rear subsection 32 on the passenger's seat side in the automobile is sized slightly smaller than the front subsection 31 at the side of the windshield 40.

The fracture grooves 30a and the central fracture groove 30b of the fracture-opening section 30 are formed as fragile sections in the interior cover 3 by emitting a pulsating laser beam generated from a laser generator (not shown), relatively moving it along the outline as well as the center line of the fracture-opening section 30 from the backside of the interior cover 3. The horizontal body portion of each of the reinforcement plates 33, 33 is fixedly joined by thermal bonding to the backsides of the front and rear subsections 31, 32 to be broken off, respectively. Further, each of the reinforcement plates 33, 33 has a mounting section 35 bent inwardly from the hinge 34 communicating with the body portions, and in the mounting section 35 are formed long holes 37 engaged with the hooks 36 protrudently mounted to the side end of the airbag case 5.

Furthermore, in the frontward to rearward shorter directions of the reinforcement ribs 12, the interval between the left and right side walls 12b, 12b of the reinforcement ribs and the interior surfaces of the left and right side edges 5c and 5c of the airbag case 5 is arranged within the range of 10 mm to 40 mm as shown by the numeral L1 in FIG. 10, and then, the interval between the left and right side wall 33a, 33a of the reinforcement plates 33, 33 is arranged within the range of 5 mm to 30 mm as shown by the number L2, with the fracture grooves 30c made in the fracture-opening section being formed at interval between 5 mm and 20 mm spaced apart from the left and right side walls 12b, 12b of the reinforcement ribs 12 as shown by the numeral L3.

In addition, the length of the protruded reinforcement ribs 12, as shown by the numeral L4, is between 5 mm and 30 mm.

Next, the forming of the fracture-opening section 30 in the interior cover 3 opposite the container 20 will be described as below.

In forming the hinge groove 30a, fracture groove 30c and the center fracture groove 30b in the interior cover 3 so as to fracture the fracture-opening section 30 when the airbag 4 inflates, a pulsating laser beam (output: 3 kW to 5 kW) of a predetermined frequency (e.g. 7 kHz) is generated intermittently at a fixed period from one of the conventional laser generators (not shown). To form the fracture groove 30c in leftward and rightward longer directions, the laser beam is emitted from the rear side of the interior cover 3 while being relatively moved at a predetermined speed along the outer periphery of the reinforcement plates 33 mounted to the rear surface, and is further emitted to form the fracture groove 30c in the frontward to rearward shorter directions at the position spaced from the left and right side walls 12b, 12b of the reinforcement ribs 12 by 5 mm to 20 mm.

Thereby, in the interior cover 3, a fragile section like a groove fractured by a laser beam is formed in accordance with the relative movement speed and the pattern of laser radiation emitted from the laser generator.

It is preferable that, when the airbag 4 inflates and expands, the divided subsection 32 on the passenger seat side of the vehicle is sized such that it does not protrude toward the slope facing the passenger seat, which continues from the horizontal surface 3b of the interior cover 3.

In accordance with the embodiment of the airbag device of the present invention as constructed above, the device can detect a force of collision by a sensor when a vehicle like is involved in a head-on collision, and can judge whether the power of collision detected by this sensor exceeds the predetermined value by using a control device such as a CPU. When judging that the power is over the predetermined value, the device instantly activates the inflator with a signal output from the control device to generate the predetermined gas, hence inflating and expanding the airbag element 4 rapidly.

At the initial time of inflating the airbag element 4, some pressure is applied to the reinforcement plate 33. However, since the section 35 for mounting the reinforcement plate member 33 remains engaged with the hook 36 of the airbag case 5 through the long hole 37, the pressurized load against the movement that the reinforcement plate 33 tends to move upward is reduced, hence reducing the resistance loaded against the thermally bonded portion joined the front and rear subsections 31, 32 occurred when the reinforcement plate 33 is deformed, and protecting the thermally bonded portion from coming off, thereby preventing the front and rear subsections 31, 32 from popping out. In addition, the fracture grooves 30c, and 30c in leftward and rightward shorter directions are formed in positions spaced from the left and right side walls 12b, 12b of the reinforcement rib in the leftward and rightward shorter directions, so that the fracture-opening section 30 of the interior cover 3 can absorb the shearing stress by its deformation just before the inflation of the airbag element 4 is completed as shown in FIG. 11, hence preventing the occurrence of a serrated portion like hangnails in the fracture section of the fracture-opening section 30, and providing a fine fracture surface.

At that time, the airbag element 4 inflates and expands outward of the interior cover 3 through the sheared subsections 31, 32 and simultaneously the shock absorption yielded by the inflation of the airbag element 4 acts as the support of the head and chest of the passenger sitting on the passenger seat, thereby protecting the passenger from the force of impact given upon collision of a vehicle and ensuring safety.

According to the passenger-side airbag device described above, the subsections 31, 32 can spread outwardly along the hinge grooves 30a and fracture grooves 30c as well as the center fracture groove 30b made on the back side of the interior cover 3 as the fragile sections by laser cutting, and the pressure against the thermal bonded portion between the subsections 31, 32 and the reinforcement plate members 33, 33 can be rather reduced. Accordingly, said construction can make it sure for the subsections 31, 32 of the interior cover 3 to lift up together with the reinforcement plate members 33, 33 without deformation thereof, hence preventing the passenger from danger, and furthermore, the adverse force exerted to the hinge sections is also significantly reduced, thus protecting the mounting sections 35, 35 for the reinforcement plates 33, 33 from being broken down.

Moreover, in the embodiment as above, the airbag device to be installed for the front passenger seat is described, but it is needless to say that the present invention can be also be applied to such airbag devices that are to be installed for the central section of the steering wheel as well as the side columns of the vehicle.

In the above preferred embodiment, the embodiment has been described about the fracture-opening section having the construction with double doors opening outward. But it should be noted that another embodiment having a single swing door may be applied although, in such an embodiment, the reinforcement plate members may have the construction slightly different from the present invention, in which the reinforcement plate members are fixedly joined by thermal bonding to the inner surface of the interior cover.

What is claimed is:

1. An airbag device for a vehicle, comprising an interior cover of the vehicle having a rectangular fracture-opening section defined by means of fragile sections which are constituted by fracture grooves formed on a back side of said interior cover;

an airbag case placed under said interior cover and adapted to accommodate an inflatable airbag element in a folded form, said airbag case having an opening which faces said fracture-opening section of said interior cover;

a reinforcement plate having a shape corresponding to said fracture-opening section; and a reinforcement rib extending downwards from the back side of said interior cover and having a rectangular cross section corresponding to said fracture-opening section, wherein mounting holes are formed in front and rear side walls of said reinforcement rib at predetermined intervals along a longitudinal direction of said reinforcement rib;

hooks firmly mounted to front and rear side walls of said airbag case at predetermined intervals along a longitudinal direction of said airbag case are engaged with said mounting holes, while passing through corresponding mounting sections extending from said reinforcement plate via corresponding hinges of said reinforcement plate;

a left side wall of said reinforcement of rib is separated from a left side wall of said airbag case by a predetermined distance, and a right side wall of said reinforcement ribs is separated from a right side wall of said airbag case by a predetermined distance;

one fracture groove partially defining said fracture-opening section is located between the left side wall of said reinforcement rib and the left side wall of said airbag case, and another fracture groove partially defining said fracture-opening section is located between the right side wall of said reinforcement rib and the right side wall of said airbag case; and wherein said fracture groove and said another fracture groove are formed in positions spaced from said left side wall of said reinforcement rib and said right side wall of said reinforcement rib respectively such that the rectangular fracture-opening section of the interior cover can absorb shearing stress by deformation of said rectangular fracture-opening section just before inflation of the inflatable airbag element.

2. An airbag device for a vehicle according to claim 1, wherein the distance between the left side wall of said reinforcement rib and the left side wall of said airbag case and the distance between the right side wall of said reinforcement rib and the right side wall of said airbag case each fall in a range of 10 mm to 40 mm, the distance between the left side wall of said reinforcement rib and a corresponding left end of said reinforcement plate and the distance between the right side wall of said reinforcement rib and a corresponding right end of said reinforcement plate each fall in a range of 5 mm to 30 mm, and the distance between the left side wall of said reinforcement rib and the corresponding fracture groove and the distance between the right side wall of said reinforcement rib and the coresponding fracture groove each fall in a range of 5 mm to 20 mm.

3. An airbag device for automobiles according to claim 1 wherein each of the fracture grooves are formed by use of a pulsating laser beam which is generated from a laser generator, and is radiated onto the back side of said interior cover while being relatively moved along the outline of said fracture-opening section, in order to laser-cut said interior cover in such a manner that said interior cover has thick portions and thin portions alternately.

4. An airbag device for automobiles according to claim 2 wherein each of the fracture grooves are formed by use of a pulsating laser beam which is generated from a laser generator, and is radiated onto the back side of said interior cover while being relatively moved along the outline of said fracture-opening section, in order to laser-cut said interior cover in such a manner that said interior cover has thick portions and thin portions alternately.

\* \* \* \* \*